UNITED STATES PATENT OFFICE.

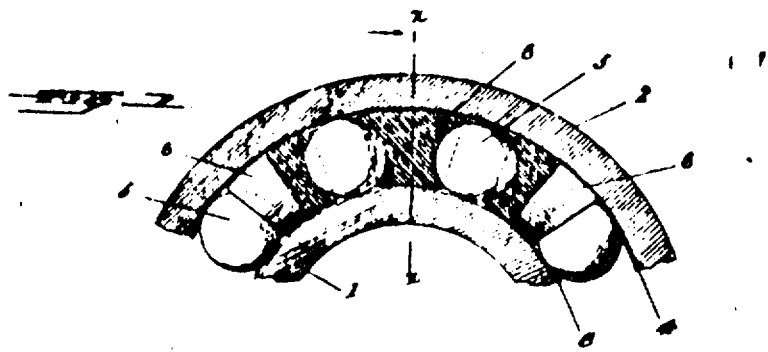
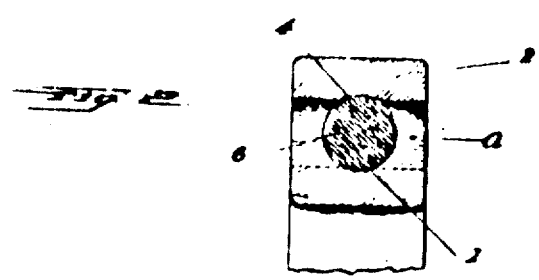
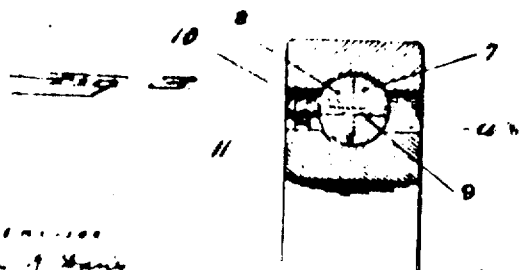

FRED EUGENE BRIGHT, OF PHILADELPHIA, PENNSYLVANIA.

BALL-BEARING.

996,206.

Specification of Letters Patent. Patented June 27, 1911.

Application filed May 18, 1906. Serial No. 317,553.

*To all whom it may concern:*

Be it known that I, FRED EUGENE BRIGHT, a citizen of the United States, and resident of Philadelphia, in the State of Pennsylvania, have invented a new and useful Ball-Bearing, of which the following is a specification.

My invention relates to ball-bearings and more particularly to those in which separators are employed between adjacent balls.

It also relates to the separators used.

The characteristics and advantages of my invention are fully described hereafter in connection with the accompanying drawing in which exemplifying structures are illustrated.

Figure 1 is a transverse section of a segment of a ball-bearing to which my invention is applied, the section being taken on a plane intersecting the ball centers; Fig. 2, a section on line *x—x* Fig. 1; and Fig. 3, a similar section of modified form.

Referring first to Figs. 1 and 2: 1 is an inner bearing ring; 2, an outer ring; 3, 4, ball races, usually of curved cross-section, formed in said rings respectively; 5, a series of balls running in the races; 6, separators interposed between adjacent balls.

The individual separators may consist of such material as metal, leather, rawhide, or other suitable substances. When leather, rawhide, or similar material is used an important advantage of my separators is that they may possess either or both resilient and lubricating qualities. I will first describe the separators of leather, rawhide, or similar material, and the manner in which such separators are placed in working position.

In the case of such a material as rawhide, the lubricating quality may be inherent in the material itself, but in the case of other material such as leather, the lubricating quality may be imparted to the material by allowing or causing it to absorb any suitable lubricating medium. When an additional lubricating medium is to be employed the material of which the separator is composed should of course be such that it will not be injuriously affected by such lubricant.

The separator 6 is conveniently shaped to fit the contour of the ball races and is therefore not liable to accidental displacement. As shown in Fig. 2 the separator approximately fits the ball races and may be placed in position therein by being compressed sufficiently to pass through the somewhat restricted outer opening between the ball rings at *a*, and when in position will resume its proper shape.

The ends of the separators may present a flat surface to the balls or, as shown in Fig. 1, each may be cupped more or less so that the ends of the separators surround segments of the balls. In this case, engagement of the cupped portions with the balls would sufficiently serve to retain the separators in position if they are made of such a size and shape as to pass freely between the bearing rings (as they may be in some cases).

The separators, as described, may conveniently in many cases be each made of one piece of material. In other cases conditions are such that it is desirable to make each of them in two or more pieces. For instance, when they are employed in a bearing, as in Fig. 3, in which the space *a* between the bearing-rings is quite small in relation to the ball diameter, the separator is conveniently made in two pieces, 7, 8. By turning these pieces half way around it is obvious they will pass easily between the bearing rings, and when within the races they may be turned to the position shown in the drawing, and secured together by any suitable means such as one or more rivets 9.

When material such as metal is used, this metal may conveniently be of a ductile nature, such as Babbitt metal or other material which is susceptible to the treatment hereafter described. Plugs of such material are originally made somewhat flattened so that they may be passed through the openings at the edges of the races and placed between the balls. By suitable means, such for instance as setting dies at one side of the separators and applying pressure at the other side as for instance by a punch and hammer, or other suitable instrument, the shape of the plugs is changed so that they more or less conform to the shape of the races or embrace segments of adjacent balls, and by either or both of these means are retained in position.

As shown in Fig. 3, in some cases it is desirable to connect all of the separators in a bearing to a ring 10 on either or both sides of the balls so that the separators form practically a unit. This may conveniently be done by extensions 11 of the rivets 9 which are suitably secured to the ring.

From the foregoing it will be apparent that important features of my invention, whether the separators are made of metal, leather, or other material, is that they are conveniently of homogeneous material and frequently in a single piece; that they are, therefore, very simple, and are readily placed between adjacent balls; and that in any position in the bearing they have the characteristic of conforming in some degree to the shape either of the balls or the ball races or both, so that they are retained in proper position by either or both of these means.

I claim:

1. In a ball-bearing, the combination of an inner and an outer bearing ring each having a ball race, balls running in the races, a resilient lubricating separator having cup-shaped ends, intermediate each two adjacent balls, and a ring to which each of said separators is connected.

2. A separator for a ball bearing, consisting of a homogeneous block of elastic lubricant carrying material, having cupped ends to engage segments of two adjacent balls.

3. A separator for a ball bearing, consisting of a homogeneous block of rawhide shaped to conform approximately to the races of the bearing and to engage segments of adjacent balls.

4. In a ball bearing, the combination of two bearing rings having opposite races of curved cross-section, balls in the races, and separators interposed between adjacent balls and extending into the ball races, each separator being composed of two segments each composed of homogeneous, elastic material, capable of being readily inserted in the bearing when separated, and means for holding the segments together.

5. A ball bearing comprising two bearing rings having opposite races of curved cross section, balls in the races and separators interposed between adjacent balls, each separator consisting of a homogeneous piece of elastic, lubricant-carrying material extending into the races and engaging directly with the balls.

In testimony whereof I have affixed my signature in the presence of two witnesses.

FRED EUGENE BRIGHT.

Witnesses:
 THEO. H. M'CALLA,
 CLEMENT L. M'CALLA.

---

Copies of this patent may be obtained for five cents each, by addressing the "Commissioner of Patents, Washington, D. C."